Figure 1:
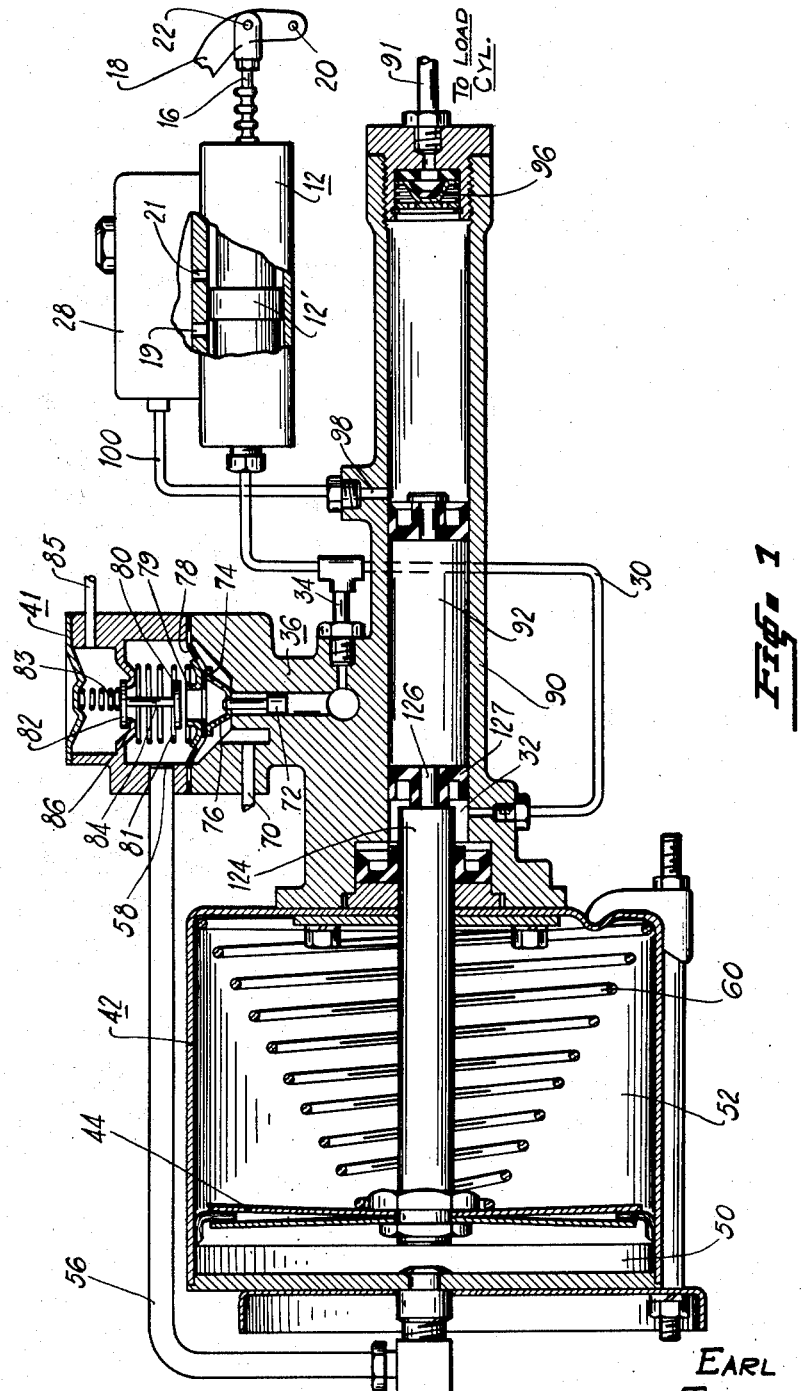

April 2, 1957 E. R. PRICE ET AL 2,787,122
BOOSTER UNIT FOR HYDRAULIC PRESSURE SYSTEM
Original Filed Oct. 4, 1943 4 Sheets-Sheet 1

INVENTORS
EARL R. PRICE
THOMAS H. THOMAS
BY
ATTORNEY

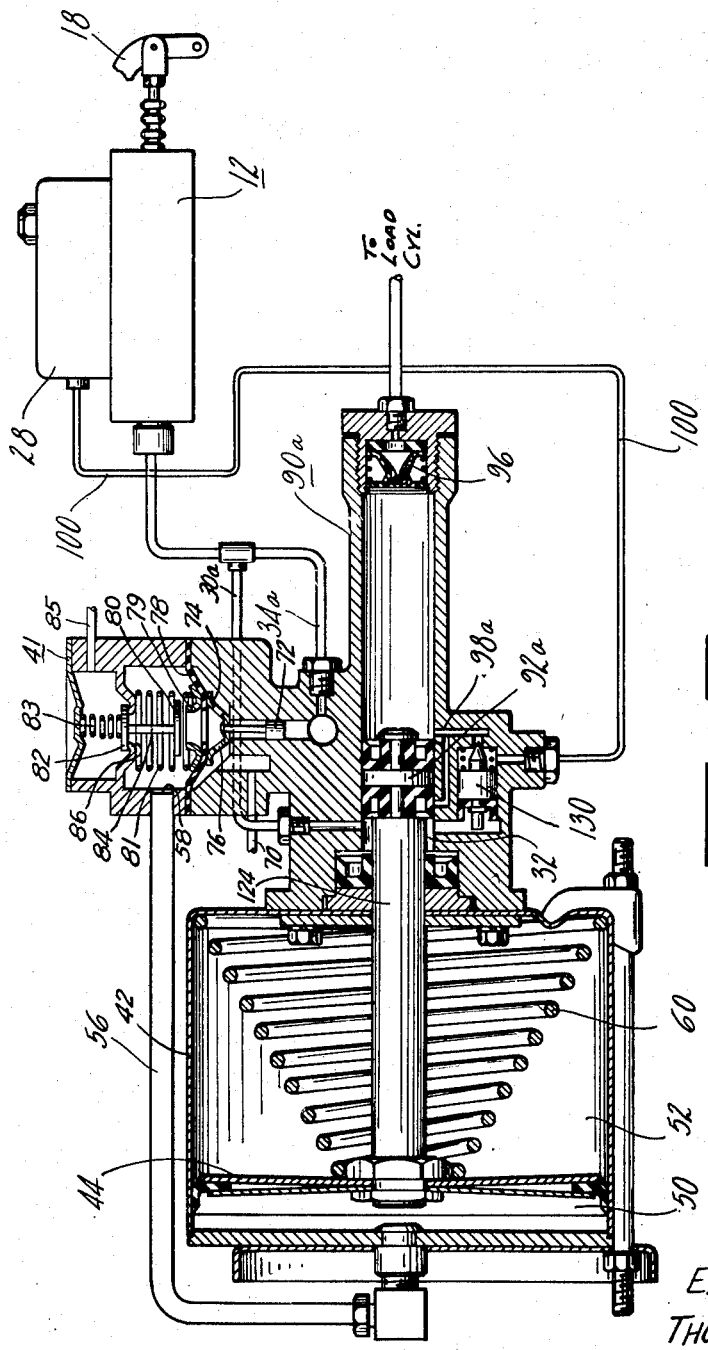

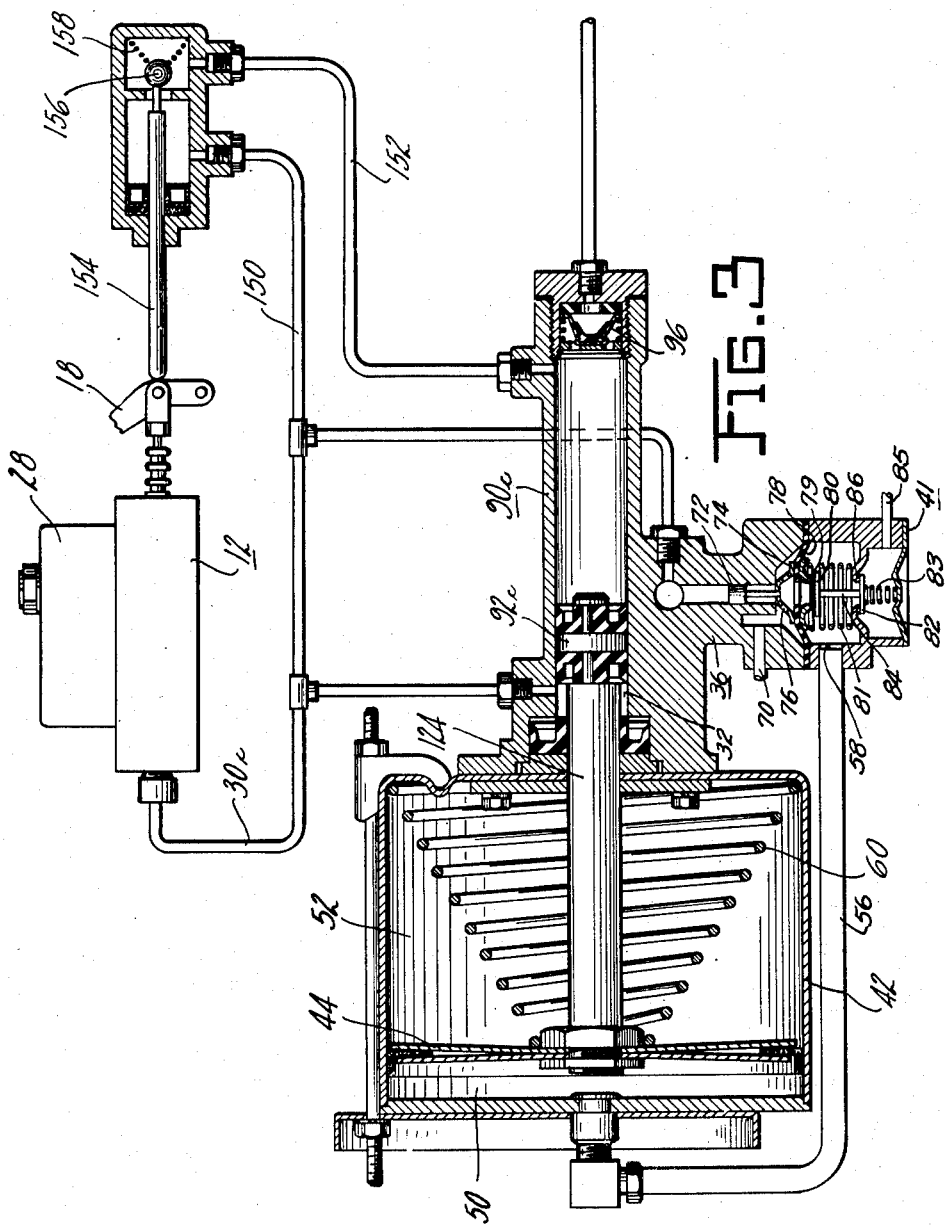

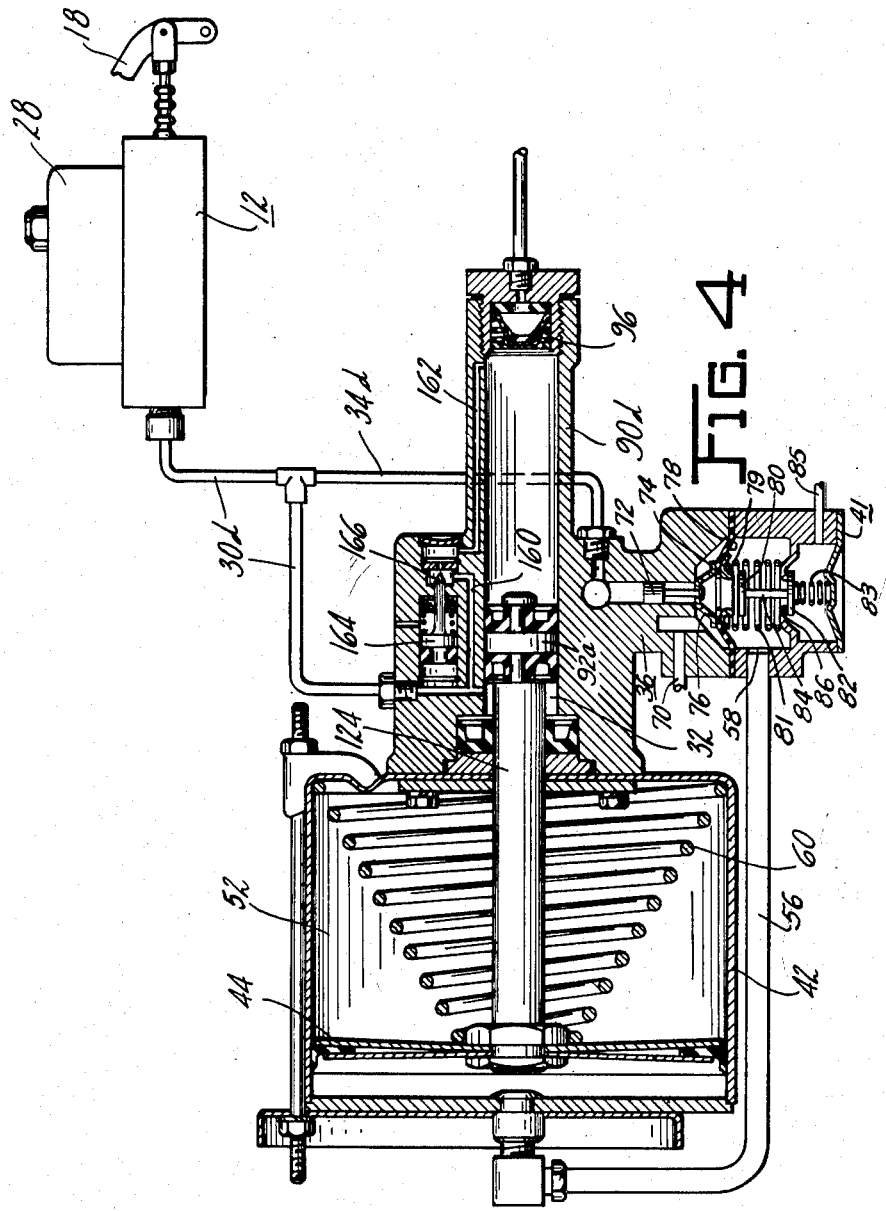

United States Patent Office 2,787,122
Patented Apr. 2, 1957

2,787,122

BOOSTER UNIT FOR HYDRAULIC PRESSURE SYSTEM

Earl R. Price and Thomas H. Thomas, South Bend, Ind., assignors to Bendix Aviation Corporation, South Bend, Ind., a corporation of Delaware Application April 11, 1947, Serial No. 740,736, now Patent No. 2,662,376, dated December 15, 1953, which is a division of application Serial No. 504,854, October 4, 1943, now Patent No. 2,470,748, dated May 17, 1949. Divided and this application June 17, 1953, Serial No. 362,278

6 Claims. (Cl. 60—54.5)

This invention relates to a booster unit for a hydraulic pressure-transmitting system which may be used for operating brakes or the like; and the instant application is a division of copending application Serial No. 740,736, filed April 11, 1947, now Patent No. 2,662,376, which in turn, is a division of Serial No. 504,854, filed October 4, 1943, now Patent No. 2,470,748.

In Price Patent 2,353,755, a hydraulic brake applying system is disclosed, wherein two master cylinders are provided, one manually operated, and the other power operated. The pressure created in the manually operated master cylinder cooperates with the power booster in creating pressure in the power operated master cylinder and additionally actuates a valve which controls the power booster. In brake applying systems of this type, the power booster, the power operated master cylinder, and the control valve for the power booster may be positioned wherever convenient on the vehicle to be braked, since only fluid connections are required between these parts of the system and the remaining parts of the system. The brake applying system shown in said patent has both "follow-up" and "feel." This means, first, that the pedal or the like which controls the manually operated master cylinder must be moved progressively farther to increase the brake applying force and, second, that a pressure proportional to that developed by the booster reacts against the pedal to apprize the operator of the extent of brake application.

In brake applying systems of the kind just described, it has heretofore been necessary to provide a manually operated master cylinder of sufficient liquid capacity or displacement to fully apply the brakes in case of power failure. In other words, the manually operated master cylinder had to be approximately as large as the power operated cylinder which was directly connected to the wheel cylinders or motors located at the several brakes. The use of a large manually operated master cylinder has certain disadvantages; or, stating it another way, the use of a small or miniature manually operated master cylinder has several important advantages.

The parent applications from which this application stems are directed toward improvements in a low-input, high-output hydraulic brake applying system, viz., a system employing a manually-operated master cylinder of low displacement with respect to a power-operated slave cylinder of relatively high displacement for effecting operation of the brake motors, the pressure created in the manually operated master cylinder cooperating with a power booster in pressurizing fluid in the slave cylinder and also functioning to actuate a control valve for said booster. In such systems, it is important that the low-displacement system be sealed off from the high displacement system during the power stroke to avoid a run-out of pedal travel without displacing sufficient liquid to apply the brakes in the event of a power failure. This poses a problem in providing an effective hydraulic fluid compensating arrangement for both systems, and the present invention has for an object the provision of such an arrangement.

Another object is to generally improve low-input, high-output hydraulic systems of the type specified.

Other objects and advantageous features of the invention will become apparent in the light of the following description taken in conjunction with the drawings, wherein:

Figure 1 is a part diagrammatic, part sectional view of a manual and booster-operated hydraulic system of the low-input high-output type; and Figures 2, 3 and 4 are similar views of manual and booster operated hydraulic systems which together with Figure 1 illustrate features to which the claims of the instant divisional application are directed.

Referring to the drawings, a small, low displacement master cylinder 12 is provided with a piston 12' reciprocable therein which is mechanically connected by means of a rod 16 to a manually operable member, such as a pedal 18 pivoted on a fixed part of a vehicle at 20, and pivotally connected to the rod 16 at 22. The master cylinder bore is connected by means of the conventional recuperation and supply ports 19 and 21, respectively with a liquid reservoir 28. The discharge end of the master cylinder bore is connected by means of a conduit 30 with a low displacement follow-up chamber 32, while a branch conduit 34 connects conduit 30 with a hydraulically operated control valve 41. The follow-up chamber 32, which may also be aptly termed an expansible chamber, a variable volume chamber, or a low displacement follow-up chamber, is defined by a cylinder 90 and a large diameter piston rod 124, both of which will be more fully described hereinafter.

The hydraulic master cylinder 12, chamber 32, and the hydraulic portion of the control valve to which conduit 34 is connected, together with the conduits, constitute an individual hydraulic system. This hydraulic system has a relatively low liquid volume displacement, i. e. a relatively small amount of liquid is displaced during the stroke of the piston in master cylinder 12. Losses of liquid in the system are compensated for, and development of vacuum in the system on the piston return stroke is prevented by means of the ports connecting the bore of the master cylinder 12 directly to the reservoir 28.

The control valve to which conduit 34 is connected is arranged to control the operation of a power cylinder, or booster. The booster, which may be of any desired type, will vary in size according to the maximum hydraulic pressure and the fluid displacement required to operate the brakes. In the illustration, the booster is a differential air pressure power cylinder 42. The term "power cylinder" is intended to include all boosters having a pressure responsive movable wall therein, whether of the diaphragm type, or the piston type. Furthermore, the term "differential air pressure" booster is intended to include both those units in which compressed air operates against air at atmospheric pressure and those units in which air at atmospheric pressure acts against partial or complete vacuum, as well as all other variations in the use of air as a pressure transmitting medium. The term "piston" as used in the claims is intended to include any pressure responsive movable wall, whether of the solid type or of the flexible diaphragm type.

Reciprocable in power cylinder 42 is a piston 44, which divides the power cylinder into chambers 50 and 52. Chamber 50 is connected by means of a pipe 56 to a port 58, which leads to the control valve. Chamber 52 is connected by means of a pipe (not shown) to a suitable source of vacuum, such as the conventional intake manifold.

The pressure in chamber 50 of the power cylinder is determined by the operation of the control valve 41. A small piston 72, which is reciprocable in motor 36, is connected by means of a cage 74, having openings 76, with a diaphragm 78. An annular member 79 connected to the diaphragm 78 provides a seat for a poppet 80, and a second poppet 82, connected to the first poppet by means of a link 84, is adapted to seat at 86 on an extension of the valve casing. With the valve parts in the position shown, pipe 70, which is connected to a vacuum source, such as the intake manifold, is in communication with pipe 56, which is connected to chamber 50 of the power cylinder. Since chamber 52 of the power cylinder is at all times connected to the vacuum source, the power cylinder is normally suspended in vacuum, and is maintained in the position shown by the return spring 60, until the valve 41 is actuated to change the pressure in chamber 50 of the power cylinder. The valve 41 is biased to released position by means of a spring 81, compressed between the casing and diaphragm 78. In addition, a small spring 83 may aid in maintaining the poppets in proper position.

In operation, pressure created in master cylinder 12 by movement of pedal 18 is transmitted to motor 36 where it exerts a pressure on piston 72, moving the piston and with it the diaphragm 78 and valve seat 79 against the resistance of spring 81. The poppet 80 seats at 79, cutting off communication between pipe 56 and the vacuum pipe 70. Further movement of piston 72 and diaphragm 78 forces poppet 82 off its seat 86, admitting air at atmospheric pressure from port 85 into the chamber between the two poppets and thence into pipe 56. Air flowing through pipe 56 into chamber 50 of the power cylinder creates a pressure differential over piston 44, urging it in the power applying direction, which in Figure 1, is toward the right.

Valve 41 is "reactionary" in the sense that it is arranged to oppose its continued actuation with a pressure proportional to the pressure delivered by the power cylinder. After the poppet 80 is seated, the diaphragm 78 becomes a pressure responsive element subjected to differential pressures, one of which is the vacuum prevailing in the pipe 70, the other of which is the pressure prevailing in pipe 56, which corresponds substantially to the pressure acting on the piston of the power cylinder. Thus, a pressure proportional to that delivered by the power cylinder acts on diaphragm 78, urging it toward piston 72, and thus creating a reaction pressure in the liquid in master cylinder 12, which pushes against the pedal 18, giving the operator a "feel" to indicate the extent of power produced by the power cylinder, or booster.

The high displacement hydraulic system which actuates the load cylinder or cylinders, also called wheel cylinders or motors, comprises a large, high displacement master cylinder, or compressor, 90, which is connected by means of a conduit 91 to the load cylinders which apply the brakes, or accomplish other desired functions. The master cylinder 90 is appreciably larger in displacement than the master cylinder 12. This difference in volume may be provided by a difference in diameters of the master cylinder bores or by a difference in the length of stroke.

The master cylinder 90 has a piston 92 reciprocable therein, and positively connected to power cylinder piston 44. The forward end of the bore of the master cylinder 90 is preferably provided with a residual pressure check valve 96, which maintains a slight pressure in the load cylinders even when the brakes are released. Compensation for losses in liquid in the large displacement hydraulic system is accomplished through a port 98 in the master cylinder wall and a conduit 100 which connects the large displacement master cylinder to the reservoir 28.

As previously stated, the follow-up chamber 32 is formed between the wall of the master cylinder 90 and the large volume displacement rod 124, which is connected to the power cylinder piston 44.

The rod 124 not only serves the purpose of transmitting pressure from the power cylinder piston to master cylinder piston 92, but additionally, because of its relatively large diameter, limits the volume of the annular follow-up chamber 32 in accordance with the displacement available at the manually operated master cylinder 12. Rod 124 and piston 92 are connected together by an integral reduced diameter link 126 having mounted thereon suitable seal means 127. It is necessary that rod 124 move whenever piston 92 moves, in order that, in the case of power failure, the manually created pressure in chamber 32 can move piston 92 forward to apply the brakes without displacing any more liquid than that necessary to fill the small annular follow-up chamber. Thus, there is no danger of pushing the pedal to the floorboard without actuating the brakes.

In order to prevent the sealing cup at the rear of piston 92 from ever passing the compensating port 98, the piston 92 is made sufficiently long that, even at the end of the brake applying stroke, chamber 32 will not be in communication with port 98. It is vital that chamber 32 never come into communication with port 98, inasmuch as such communication would permit the liquid under pressure in chamber 32 to drain back to the reservoir 28.

Operation of the entire pressure creating and transmitting system is as follows:

By depressing the pedal 18 (the term "pedal" is intended to include broadly any manually operable member), the operator creates a pressure in master cylinder 12. This pressure is transmitted both to chamber 32, where it exerts a pressure on piston 92, and to control valve where it exerts a pressure tending to cause chamber 50 of the power cylinder to be connected to air. As air passes through pipe 56 into chamber 50 of the power cylinder, a pressure differential is created acting over power cylinder piston 44, urging it toward the right to push piston 92 in the pressure creating direction. Thus piston 92 is subjected to the combined pressures of the power cylinder and of the liquid in chamber 32, the latter acting only on the small annular area which represents the difference between the areas of piston 92 and rod 124. Moving on its stroke, piston 92 displaces liquid under pressure to the load cylinders to apply the brakes.

As the power cylinder piston 44 moves on the power applying stroke, forward movement of piston 92 causes the volume chamber 32 to gradually increase, thereby permitting liquid from master cylinder 12 to enter the follow-up chamber. This tends to reduce the pressure in the control valve and permit the valve to return to lapped position, unless the operator "follows up" by progressively depressing the pedal 18. As above noted, the control valve is also "reactionary," in the sense that it is arranged to oppose its continued actuation with a pressure proportional to the pressure developed by the power cylinder.

The displacement of the manually operated master cylinder 12 need only be sufficient to handle the displacement of follow-up chamber 32 plus the displacement of the control valve. The power operated master cylinder 90 must have a displacement adequate to match the required displacement of the load cylinder or cylinders.

Because of the low displacement of the manually operated hydraulic system, this system becomes, relatively speaking, a high pressure system. That is, assuming that a given displacement is necessary at the load cylinders, our invention permits the manually operated hydraulic system to be operated at a pressure much higher than has heretofore been possible. This is true because the low displacement of the manually operated hydraulic system permits a high ratio of pressure in the master cylinder 12 to pressure exerted by the operator on the pedal. On the other hand, the hydraulic system which includes the master cylinder 90 may be considered as a relatively low pressure system, in the sense that it operates at a lower pressure and higher displacement, assuming a given displacement of the manually operated master cylinder, than has heretofore been possible.

It is important that the brake applying unit be operable to apply the brake manually in case of power failure. We have previously pointed out that, in case of power failure, the manually created pressure in chamber 32 acts through piston 92 to apply the brakes. It is also important that, in case of power failure, insurance be provided against forcing the liquid from the low displacement hydraulic system into the high displacement system, and thereby running out of pedal travel without displacing sufficient liquids to apply the brakes. As previously explained, in the unit shown in Figure 1, we have avoided this danger by making piston 92 sufficiently long to prevent chamber 32 from coming into communication with port 98. Furthermore, port 98 is not connected to the bore of master cylinder 12 for the purpose of providing liquid compensation, as was the case in Price Patent No. 2,353,755 referred to above. Instead, the chamber in front of piston 92 is connected directly to reservoir 28.

The modified embodiment of our invention shown in Figure 2 corresponds very closely to the embodiment of Figure 1, except that the piston 92a in the power operated master cylinder 90a of Figure 2 is considerably shorter than the piston 92 of Figure 1. As in the embodiment of Figure 1, the piston 92a of Figure 2 is directly connected to the volume displacement rod 124. In order to prevent the fluid displaced by the pedal master cylinder 12 from returning to the reservoir 28 through conduit 100 after the sealing cup at the rear of piston 92a is past the compensating port in the cylinder 90a, a valve 130 is caused to move to seated, or closed, position by the pressure in master cylinder 12, thereby cutting off the passage leading from the compensating port 98a to conduit 100. The advantage of the device shown in Figure 2 over the device shown in Figure 1 is that it permits the use of a shorter power operated master cylinder.

Figures 3 and 4 disclose modified embodiments of our invention wherein the same reservoir is used to supply liquid for compensating purposes to both the low displacement and the high displacement hydraulic systems. In both cases means are shown for closing the compensating connection between the low displacement and the high displacement systems immediately upon movement of the brake pedal by the operator in a direction to create pressure in the manually operated master cylinder.

In Figure 3 the bore of manually operated master cylinder 12 is connected by means of conduits 150 and 152 to the high displacement liquid pressure system. Initial actuation of the pedal 13 allows leftward movement of rod 154, permitting ball valve 156 to seat under the influence of spring 158, closing the compensating connection between the low displacement hydraulic system and high displacement hydraulic system. The area of the valve seat must be sufficiently small and the strength of the spring must be sufficiently great to insure that the pressure of fluid in conduit 150 can not force the valve open against the pressure of fluid in 152, even though there has been failure of power and the ratio of pressure in conduit 150 to pressure in conduit 152 is at a maximum, being equal to the ratio of the area of the piston in thte secondary master cylinder to the annular area which represents the difference between the area of the piston and the area of the rod behind the piston.

In Figure 4 the high displacement hydraulic system is connected for the purpose of compensation to the low displacement master cylinder 12, by means of passages 160 and 162. Pressure created in master cylinder 12 upon initial movement of the pedal 13 moves plunger 164, and thereby a valve 166 in a direction to cut off communication between passages 160 and 162, and thereby cut the high displacement liquid system off from the low displacement liquid system.

Although certain particular embodiments of our invention have been described, it will be understood by those skilled in the art that the object of the invention may be attained by the use of constructions different in certain respects from those disclosed without departing from the underlying principles of the invention. We therefore desire by the following claims to include within the scope of our invention all such variations and modifications by which substantially the results of our invention may be obtained through the use of substantially the same or equivalent means.

We claim:

1. A manual and booster actuated hydraulic system comprising a manually operable member, a low displacement master cylinder operatively connected with said member and having a compensating port, a high displacement second master cylinder having a piston reciprocable therein, a differential air pressure booster, a hydraulically operated valve hydraulically connected to the manually operated master cylinder and operatively connected with the booster to effect operation of the booster, means opposing operation of said hydraulically operated valve with a pressure which raises progressively to indicate increasing pressure developed by the booster, means operatively connecting the booster to the piston of the second master cylinder, a low displacement follow-up chamber in communication with the first mentioned master cylinder and operatively associated with the second master cylinder whereby pressure of fluid in the chamber cooperates with the booster in actuating the piston of the second master cylinder, the volume of the chamber being increased as the booster moves in a direction to actuate said piston, a fluid compensating connection means in communication between said first and second master cylinders, the fluid in said second master cylinder being compensated from the first master cylinder, and means responsive to initial displacement of fluid from the first master cylinder operatively associated with said first and second master cylinders for closing the compensating connection of the second master cylinder.

2. A manual and booster actuated hydraulic system comprising a manually operable member, a low displacement master cylinder operatively connected with said member and having a compensating port, a high displacement second master cylinder having a piston reciprocable therein, a differential air pressure booster, a hydraulically operated valve hydraulically connected to the manually operated master cylinder and operatively connected with the booster to effect operation of the booster, means opposing operation of said hydraulically operated valve with a pressure which raises progressively to indicate increasing pressure developed by the booster, means operatively connecting the booster to the piston of the second master cylinder, a low displacement follow-up chamber in communication with the first mentioned master cylinder and operatively associated with the second master cylinder whereby the pressure of fluid in the chamber cooperates with the booster in actuating the piston of the second master cylinder, the volume of the chamber being increased as the booster moves in a direction to actuate said piston, a fluid compensating connection means in communication between said first and second master cylinders, the fluid in said second master cylinder being compensated from the first master cylinder, and means responsive to initial movement of the manually operable member operatively associated with said first and second master cylinders for closing the compensating connection of the second master cylinder.

3. A manual and booster actuated hydraulic system comprising a manually operable member, a low displacement master cylinder operatively connected with said member and having a compensating port, a high displacement second master cylinder having a piston reciprocable therein, a differential air pressure booster, a hydraulically operated valve hydraulically connected to the manually operated master cylinder and operatively connected with the booster to effect operation of the booster, means opposing operation of said hydraulically operated valve with a pressure which raises progressively to indicate increasing pressure developed by the booster, means operatively connecting the booster to the piston of the second master cylinder, a low displacement follow-up chamber in communication with the first mentioned master cylinder and operatively associated with the second master cylinder whereby pressure of fluid in the chamber cooperates with the booster in actuating the piston of the second master cylinder, the volume of the chamber being increased as the booster moves in a direction to actuate said piston, a fluid compensating connection means in communication between said first and second master cylinders, the fluid in said second master cylinder being compensated from the first master cylinder, and valve means responsive to initial increase of pressure in the first master cylinder operatively associated with said first and second master cylinders for closing the compensating connection of the second master cylinder.

4. A manual and booster actuated hydraulic system comprising a manually operable member, a low displacement first master cylinder operatively connected with said member, a high displacement second master cylinder having a piston reciprocable therein, a differential air pressure booster operatively connected to said piston, means in communication with said first master cylinder responsive to displacement of fluid in said first master cylinder for controlling differential air pressure in said booster, means comprising a source of compensating fluid, a fluid compensating connection between said first and second master cylinders, and fluid pressure responsive valve means operable due to initial displacement of fluid from the first master cylinder in communication with said source of compensating fluid and said second master cylinder for closing the compensating connection to the second master cylinder.

5. A manual and booster actuated hydraulic system comprising a manually operable member, a low displacement first master cylinder operatively connected with said member, a high displacement second master cylinder having a piston reciprocable therein, a differential air pressure booster operatively connected to said piston, means responsive to displacement of fluid in said first master cylinder for initiating a power stroke of said booster, means comprising a source of compensating fluid for the system, means communicating said source of compensating fluid with the second master cylinder, and a valve for controlling said communicating means, said valve being movable to a position closing off communication with said source of compensating fluid in response to initial displacement of fluid in said first master cylinder.

6. A manual and booster actuated hydraulic system comprising a manually operable member, a low displacement first master cylinder operatively connected with said member, a high displacement second master cylinder having a piston reciprocable therein, a differential air pressure booster operatively connected to said piston, means responsive to displacement of fluid in said first master cylinder for initiating a power stroke of said booster, means comprising a source of compensating fluid for the system, a connection from said source of compensating fluid to said second master cylinder, a valve for controlling said connection and biased to a position permitting compensation thru said connection, and means for moving said valve to a position closing said connection in response to initial displacement of fluid in said first master cylinder.

References Cited in the file of this patent
UNITED STATES PATENTS
2,372,014   Rockwell _____ Mar. 20, 1945